US011216560B2

(12) United States Patent
Soryal

(10) Patent No.: US 11,216,560 B2
(45) Date of Patent: Jan. 4, 2022

(54) INTEGRITY PRESERVATION FOR MASTER SERVER THAT UPDATES OTHER SYSTEMS

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 480 days.

(21) Appl. No.: 16/392,231

(22) Filed: Apr. 23, 2019

(65) Prior Publication Data

US 2020/0342107 A1    Oct. 29, 2020

(51) Int. Cl.
*G06F 21/57*    (2013.01)
*G06F 8/71*    (2018.01)
*G06F 8/65*    (2018.01)

(52) U.S. Cl.
CPC .............. *G06F 21/57* (2013.01); *G06F 8/65* (2013.01); *G06F 8/71* (2013.01)

(58) Field of Classification Search
CPC ........ G06F 8/65; G06F 21/31; G06F 3/04847; G06F 21/57; G06F 8/71
See application file for complete search history.

(56) References Cited

U.S. PATENT DOCUMENTS

2009/0235244 A1\*  9/2009  Enomori ............. H04L 12/2814
                                                    717/170
2017/0019498 A1\*  1/2017  Ng ........................ H04L 63/105

OTHER PUBLICATIONS

Christopher M. Hayden et al.; Evaluating Dynamic Software Update Safety Using Systematic Testing; IEEE; pp. 1340-1354; retrieved on Oct. 4, 2021. (Year: 2012).\*

\* cited by examiner

*Primary Examiner* — S. Sough
*Assistant Examiner* — Cuong V Luu
(74) *Attorney, Agent, or Firm* — Guntin & Gust, PLC; Ralph Trementozzi

(57) ABSTRACT

A method includes monitoring access by a first user to a first updating server and a second updating server, suspending access by the first user to the second updating server when the first user accesses the first updating server to load code updates to the first updating server, comparing a first code update from the first updating server and a second code update from the second updating server, and downloading the first code update based on the comparing step. The downloading step occurs only when the first code update and the second code update are identical.

17 Claims, 4 Drawing Sheets

INTEGRITY PRESERVATION FOR MASTER SERVER THAT UPDATES OTHER SYSTEMS

TECHNICAL FIELD

Embodiments of the present inventions relate to methods and systems for securely downloading firmware and software to remote devices.

BACKGROUND

There has been a proliferation of firmware and software components in newer applications such as vehicles, machines, and other IoT devices. Some of these devices may receive updates remotely, such updates including new patches and upgrades. There is an assumption that the updating system is trusted, meaning that the updating system is owned or run by a network service provider or a manufacture of the devices that are being updated. However, even trusted systems are vulnerable to hacking whereby malicious code can be downloaded onto such devices. The introduction of malicious code could be catastrophic, for example, in that such code may disable security features of a connected car, alter the guidance system of a self-driving vehicle and create malfunctions in surgical equipment. Not all vulnerabilities are outward facing.

Even in a trusted updating system, a rogue employee may alter software and firmware to introduce malicious code into remote devices. Even innocent mistakes in a trusted environment whereby non-tested or non-verified code may downloaded to remote devices may cause problems.

There is a need for a system and method to ensure that remote software and firmware downloads are secure and can be trusted.

SUMMARY

The present disclosure is directed to a method including monitoring access by a first user to a first updating server and a second updating server, suspending access by the first user to the second updating server when the first user accesses the first updating server to load code updates to the first updating server, comparing a first code update from the first updating server and a second code update from the second updating server, and downloading the first code update based on the comparing step. The downloading step may occur only when the first code update and the second code update are identical. The method may further include setting an input to a verification processor from the first server to a "1" and the input to the verification processor from the second server to a "1" if the code updates are identical, thereby enabling the downloading step. In an aspect, the comparing step is performed by periodically comparing code versions in each of the first updating server and the second updating server. The method may further include setting a first input to a verification processor from the first server to a "1" and a second input to the verification processor from the second server to a "0" when the first user accesses the first updating server thereby preventing the downloading step and loading the second code updates by a second user to the second updating server and changing the second input to the verification processor to a "1" thereby enabling the downloading step. In an aspect, the method may include loading the second code updates by a second user to the second updating server and wherein the downloading step is initiated when the first code update matches the second code update. The method may include setting the second input to a verification processor to a value of "0" based on the suspending step, thereby preventing the downloading step and changing the second input to the verification processor to a value of "1" when the first code update matches the second code update thereby enabling the downloading step.

The disclosure is also directed to a system including a first updating server and a second updating server, a verification processor configured to receive a first input from the first updating server and a second input from the second updating server wherein the first input has a value of "1" when a first code update is ready for downloading from the first updating server to a remote device and wherein the second input has a value of "0" until a second code update equivalent to the first code update is loaded onto the second updating server and wherein the second output changes to a value of "1" when the second code update is equivalent to the first code update. The system may include a router configured to route the first code update to the remote device and a controller configured to monitor access to the first updating server and the second updating server and to prevent access to the second updating server by a first user when the first user accesses the first updating server. The system may include wherein an alarm is generated when the first updating server is accessed by the first user and wherein the second updating server may only be accessed by a second user. In an aspect, the code updates are downloaded only when the first updating server and the second updating server are accessed by different users and in an aspect, the downloads are prevented unless both the first input and the second input are set to a value of "1."

The disclosure is also directed to a system including a first updating server and a second updating server, and wherein the second updating server has a processor and a memory coupled with the processor, the memory having stored thereon executable instructions that when executed by the processor cause the processor to effectuate operations including determining that there is a first code update for downloading to a remote on the first updating server, blocking access to the second updating server by the first based on the determining step, receiving a second code update from a second user, and if the first code update and the second code update are identical, then downloading the second code update to the remote device. The system may further include a verification processor wherein the first updating server has an output to a first input of the verification processor and the second updating server has an output to a second input of the verification processor and wherein the first input has a value of a "1" based on the first code update and the second input has a value of "0" thereby blocking the downloading step until the second updating server receives the second code update matches the first code update and the value then changes to a "1" and thereby enabling the downloading step. In an aspect, the determining step is performed periodically by comparing code versions of the first updating server and the second updating server.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF EMBODIMENTS

Operational Summary. The present disclosure solves the problem of preventing malicious code from being downloaded to remote devices. For systems that update remote clients over the internet or cellular networks, these systems should be protected to prevent malicious code from being sent to remote clients during software or firmware system upgrades. The present disclosure system features a set of updating servers wherein only one updating server can be modified at any given time. For example, a code developer or maintainer may be able to update the code only on one updating server/system at a time. Any other systems or components of the system would be locked down and not accessible during the update period by the same software developer(s) or maintainer(s). For the purposes of this disclosure, a first updating server and a second updating server will be used as an exemplary embodiment, but having two or more updating servers is considered within the scope of this disclosure.

The second updating server may sense the lockdown and then trigger an alert, an alarm or some other notification signifying that a change is occurring on the other server.

When the updates are completed by a developer or system maintainer and ready to be downloaded, authorized personnel such as managers, administrators or auditors may then take over the responsibility for the remote downloads. The tested and verified software or firmware updates may then be loaded onto two identically configured updating servers. The system will be prevented from completing a download unless both software code updates are identical. For example, an output of the two servers having the two updated code sets may by undergo a logical AND function wherein the logical AND function is performed in a tamper-resistant box. Only code updates signed by such verification method will be accepted as downloads by the remote devices.

In an aspect, the second updating server and all other updating servers when they sense the first updating server is being accessed, may change the output of the server to the logical AND function equal to "0". The newly modified first updating server may have its output to the logical AND function set equal to "1" when the code updates are loaded and ready to be sent to the remote devices. Only when a second updating server has its output to the logical AND function set equal to "1" as set forth herein will the download start.

Unless otherwise stated, this disclosure will use the term "code updates" interchangeably with and/or to include software updates, firmware updates, upgrades, error fixes, patches, new application downloads from the App Store® or Google Play® or any other type of over the air or remote software downloads.

Figure 1:
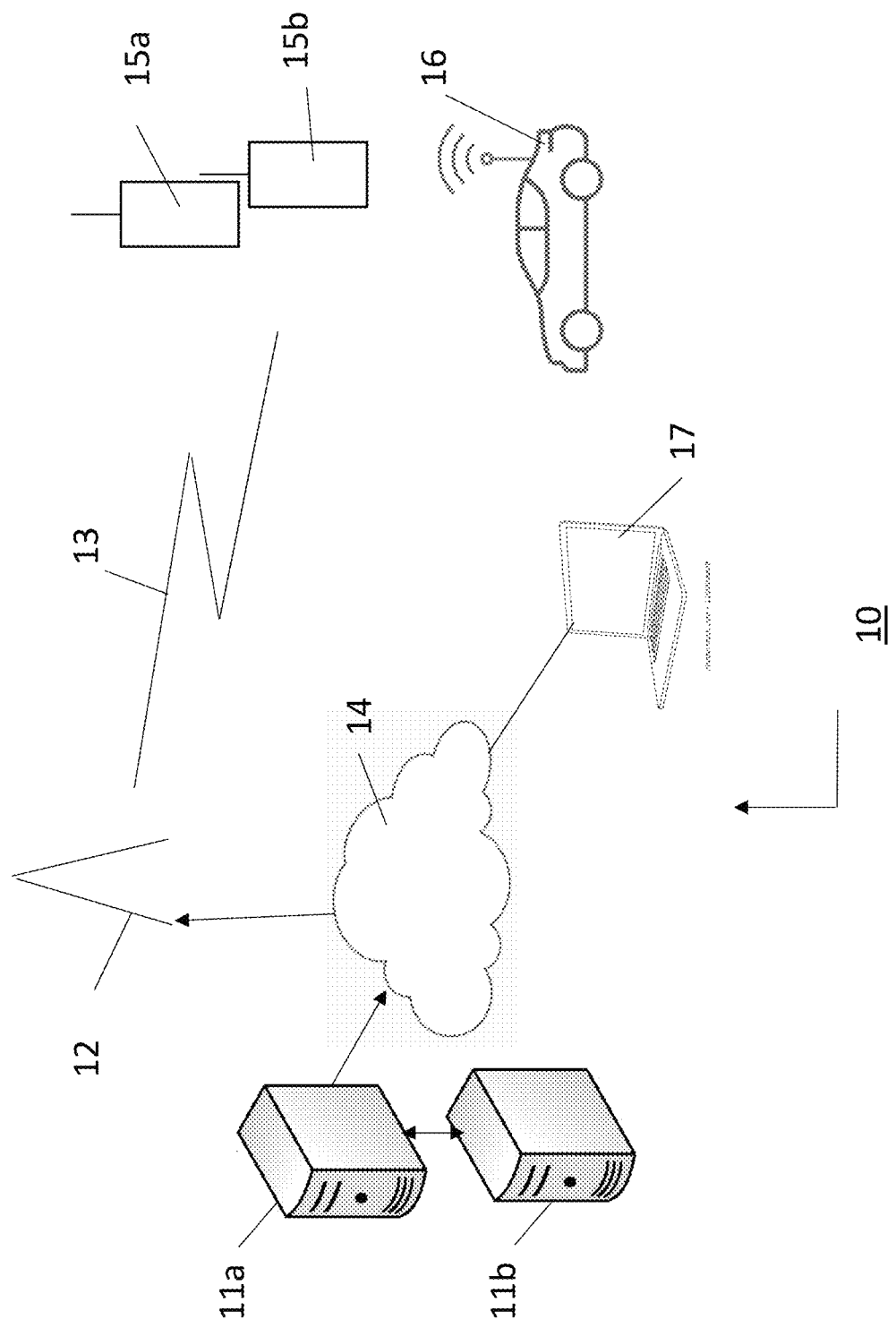
FIG. 1 is a schematic representation of an exemplary system environment in which the methods and systems of the present disclosure may be implemented.

System Environment. Illustrated in FIG. 1 is a schematic representation of an exemplary system environment 10 in which embodiments of the present disclosure may operate.

The exemplary system environment 10 may include an updating system having two or more updating servers, shown as servers 11a, 11b. The updating servers 11a, 11b may be in communication with network 14. Network 14 may be any type of network 14 which, for example, may be a combination of wireless and/or wired network communication systems. The network 12 may include components of the Public Switched Telephone Network (PSTN) as well as wireless network systems including 3G, 4G/LTE, 5G, WiFi, WiMAX, and any other wireless network communications system now known or to be developed in the future. The network 14 itself and data communications across the network 12 is known by those skilled in the art.

In the case wherein network 14 is a wireless network, network 14 may be able to communicate wirelessly through cell tower 12 and air interface 13. As such, updating servers 11a, 11b may in communication with remote devices such as user devices 15a, 15b and connected vehicle 16 wirelessly and be in communication with computer 17 either wired or wirelessly.

Figure 2:
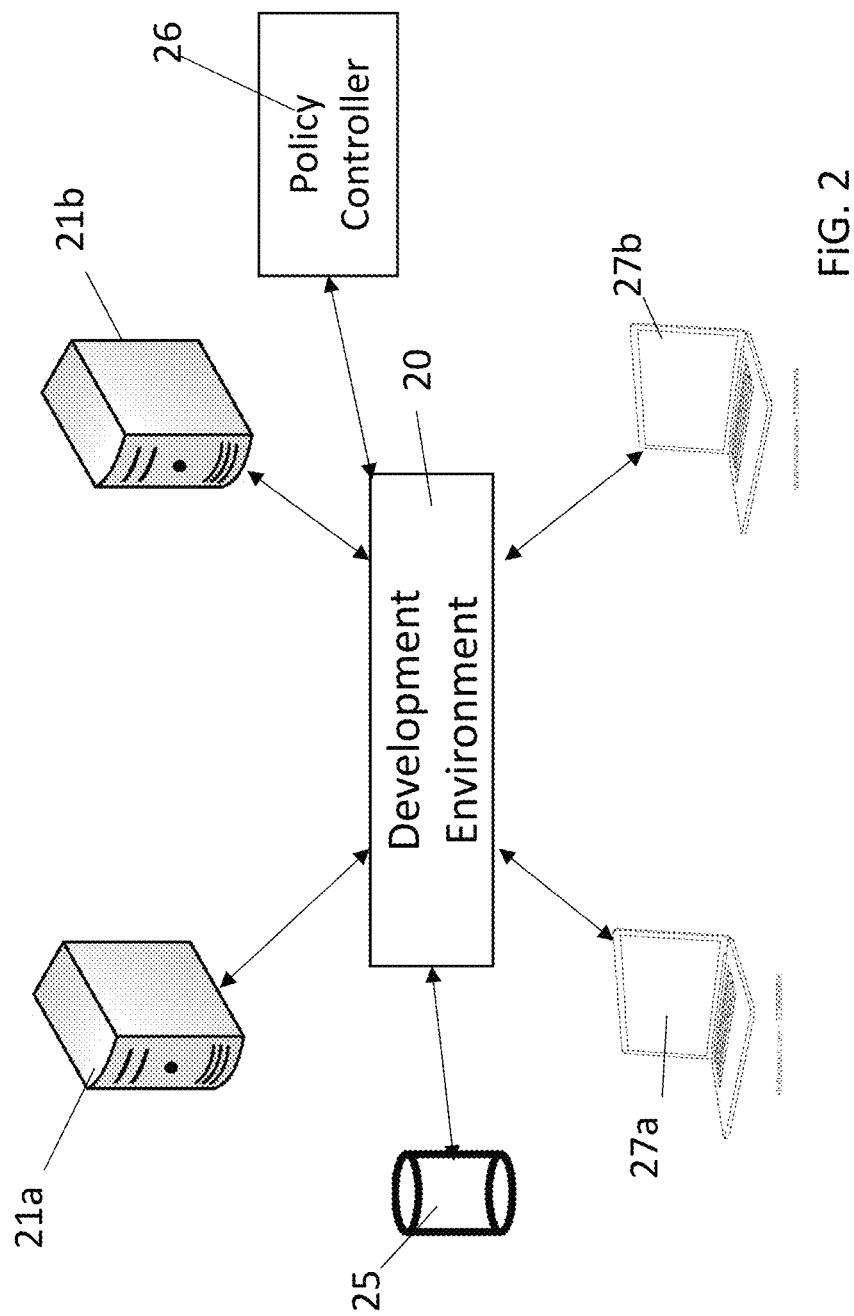
FIG. 2 is a system architecture diagram of an exemplary system development environment in which the methods and systems of the present disclosure may be implemented.

With reference to FIG. 2, there is shown a software development environment 20. The software development environment may, for example, include one or more developer workstations 27a, 27b in communication with one or more updating servers 21a, 21b. In an aspect, updating servers 21a, 21b may be identically or substantially identically configured with respect to their ability to act as a master in a master-client download scenario. For example, updating servers 21a, 21b may be identically configured with respect to the controls used for remote downloads of code to external devices. Likewise, updating servers 21a, 21b may include identical versions of the executable code running on external devices or be able to access such code from database 25.

Software code and other code updates may be stored in database 25. Database 25 may include controlled code libraries in which official released code versions are segregated from code under test and development or beta versions of such code. In an aspect, updating servers 21a, 21b may be able to retrieve the current version of code running on one or more external devices 35 or retrieve code updates destined for such external devices 35.

The software development environment 20 may include routers and switches which permit one or more developer workstations 27a, 27b to communicate with one or more updating servers 21a, 21b and to access database 25. In an aspect, there may be a policy controller 26 which may set and enforce policies with respect to the workstations' 27a, 27b ability to access database 25 and updating servers 21a, 21b. For example, the policy controller 26 may set a policy that restricts a developer at workstation 27a from communicating with more than one updating server 21a, 21b at a time. Thus, if a developer uses her credentials to log onto workstation 21a and accesses updating server 21a, then that developer would be barred from accessing updating server 21b until that restriction was later cleared by the policy controller 26. This would prevent a developer from corrupting code updates intentionally or unintentionally on more than one updating server 21a, 21b.

When a developer does access one of the updating servers 21a, 21b, the policy controller 26 may generate an alert that signifies that the contents of one of updating servers 21a, 21b may no longer be identical or substantially identical with respect to their ability to control and execute downloads to remote devices 35. The alert may be in the form of an email, a text message, an alarm, or other notification to another computer or individual such as a manager, an administrator, an auditor or any other trusted person. In an aspect, updating servers may have a Hash that it shared among the updating servers. If the Hash of two or more updating servers do not match, the updating servers will know that one of the updating servers has been changed and thereafter trigger an alarm or other alert.

In an aspect, a developer may log onto one of the workstations 27a, 27b and develop code enhancements, upgrades, patches or other error fixes off-line and test those changes. Code update may be stored in database 25 until ready to be downloaded to remote devices 35. At that time, the developer or another person may log on to one of the workstations 27a, 27b and load the code updates onto one of the updating servers 21a, 21b. The policy controller 26 would prevent that same developer from accessing any other updating server 21a, 21b until the alert is cleared. Moreover, in an aspect, access to any other updating server 21a, 21b may be blocked from all personnel during the updates to the first updating server 21a, 21b. A second person, perhaps a manager, administrator or an auditor, may then logon to another workstation and load the same code updates onto a different updating server 21a, 21b. At that point, the download process may begin.

Figure 3:
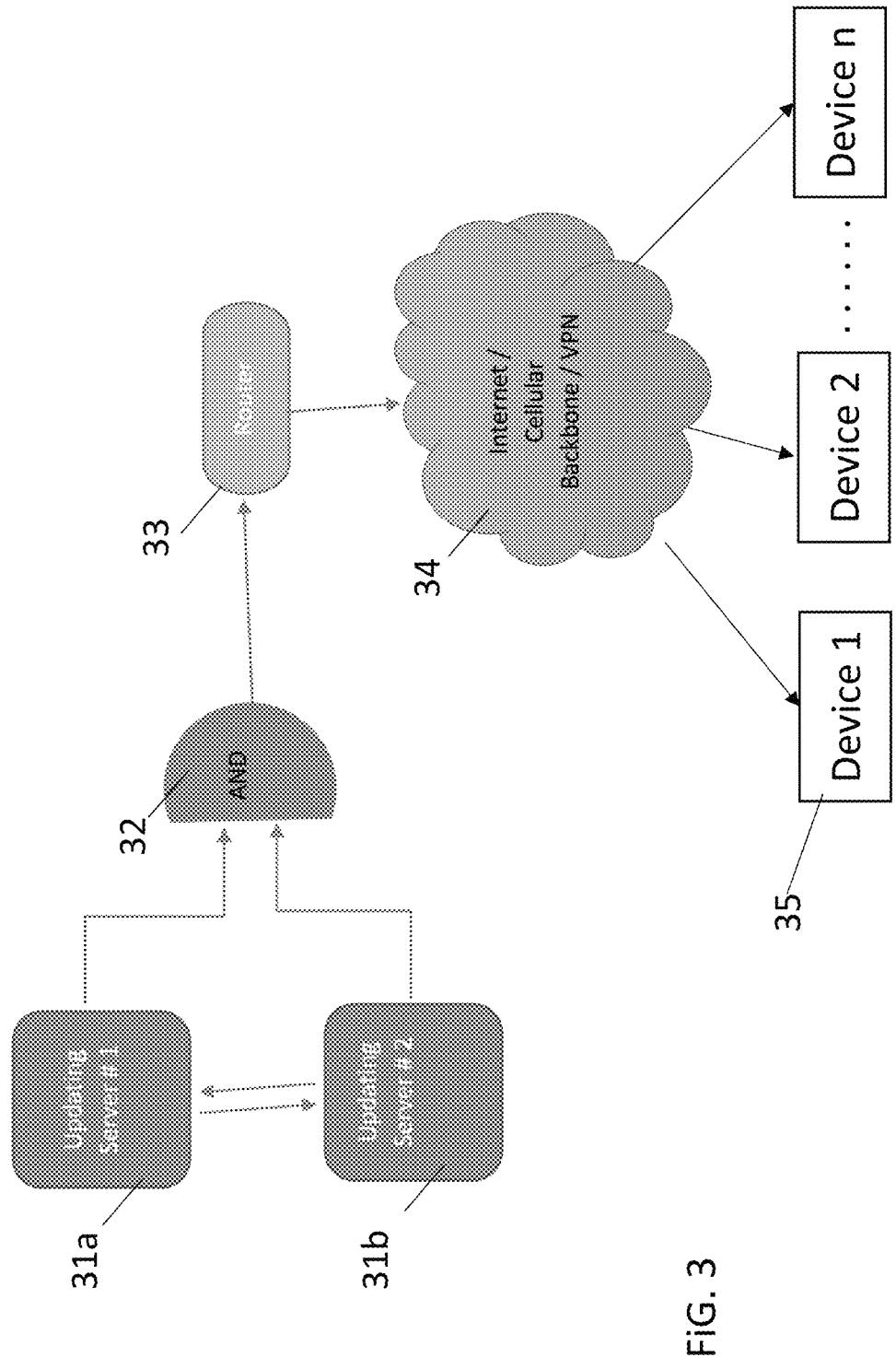
FIG. 3 is a system architecture diagram of an exemplary data flow from updating servers to remote devices.

With reference to FIG. 3, there is shown updating server 31a and updating server 31b. It will be understood that while the example shown has two updating servers, there may be more than two such updating servers. Assuming the proper protocol was followed, each of these updating servers 31a, 31b should be identically configured with respect to the code updates to be downloaded to the remote devices, shown in FIG. 3 as device 1, device 2 through device n and referred to collectively as device(s) 35. The code updates to be downloaded may be passed through a verification processor 32 which may, for example, be a logical AND verification processor 32 which will compute a logical AND function, comparing the outputs of updating server 31a and updating server 31b.

In an aspect, an output of each of updating servers 31a, 31b will have an input to the logical AND verification processor 32. When one of the updating servers 31a, 31b is accessed to initiate a download, for example, updating server 31a, the other updating server 31b will compare its hash to the hash of the changed updating server 31a and recognize that a change has occurred. The second updating server 31b and any other updating servers will set their respective inputs to the logical AND verification processor 32 to "0". The newly modified updating server 31a will set its input to the logical AND processor to "1". This embedded process that controls whether a "1" or "0" is input to the logical AND verification processor 32 from the updating servers 31a, 31b is secured and tamper-proof and does not allow any interaction directly except for the result of comparing the respective hashes of the updating servers. This embedded process may receive the hash for all updating servers' new firmware and makes that determination independently, namely, if there is a match, then it will set its bit to "1", if there is no match, it will set it to "0" and raise the alarm/alert. The output to the logical AND verification processor 32 may be set to a value of "1" prior to any transmission from an updating server 31a, 31b which would open the AND gate for a certain period of time during which the code updates may be downloaded. The time period may be calculated based on the size of the code updates, hardware characteristics and other factors sufficient for the download to occur but not too long as to expose the system to unauthorized further downloads.

In an aspect, the updating servers 31a, 31b will perform matching queries periodically. The updating servers 31a, 31b will change their inputs to the logical AND function from a "0" to "1" if they match.

If the code updates in the two updating servers 31a, 31b compare identically, then the download process will initiate because the output of the logical AND verification processor will be set to "1". For example, at the beginning of transmitting the updates, all servers will send their "1"s or "0"s to the logical AND verification processor 31 and if there is a match of "1's", the logical AND gate will open and remain open for a certain period of time sufficient to push out the updates from one of the updating servers 31a, 31b. The updating server 31a, 31b may be selected by a system election process or manually by the first user or second user. The download will commence from one of updating servers 31a, 31b to router 33. The timing protocol may be preset such that all updating servers 31a, 31b are synchronized.

Router 33 will determine which remote device(s) 35 would receive the code updates and route to the appropriate network 34, which may be one of backbone, VPN, wireless or internet to be then sent to the device(s) 35.

In an aspect, there may be two stage verification. Each of the device(s) 35 may send to each of updating server 31a, 31b a verification code upon receipt of the code updates and prior to installing the code updates. If both updating servers 31a, 32b, respond with the correct verification code, then device(s) 35 may proceed to install the code updates.

Figure 4:
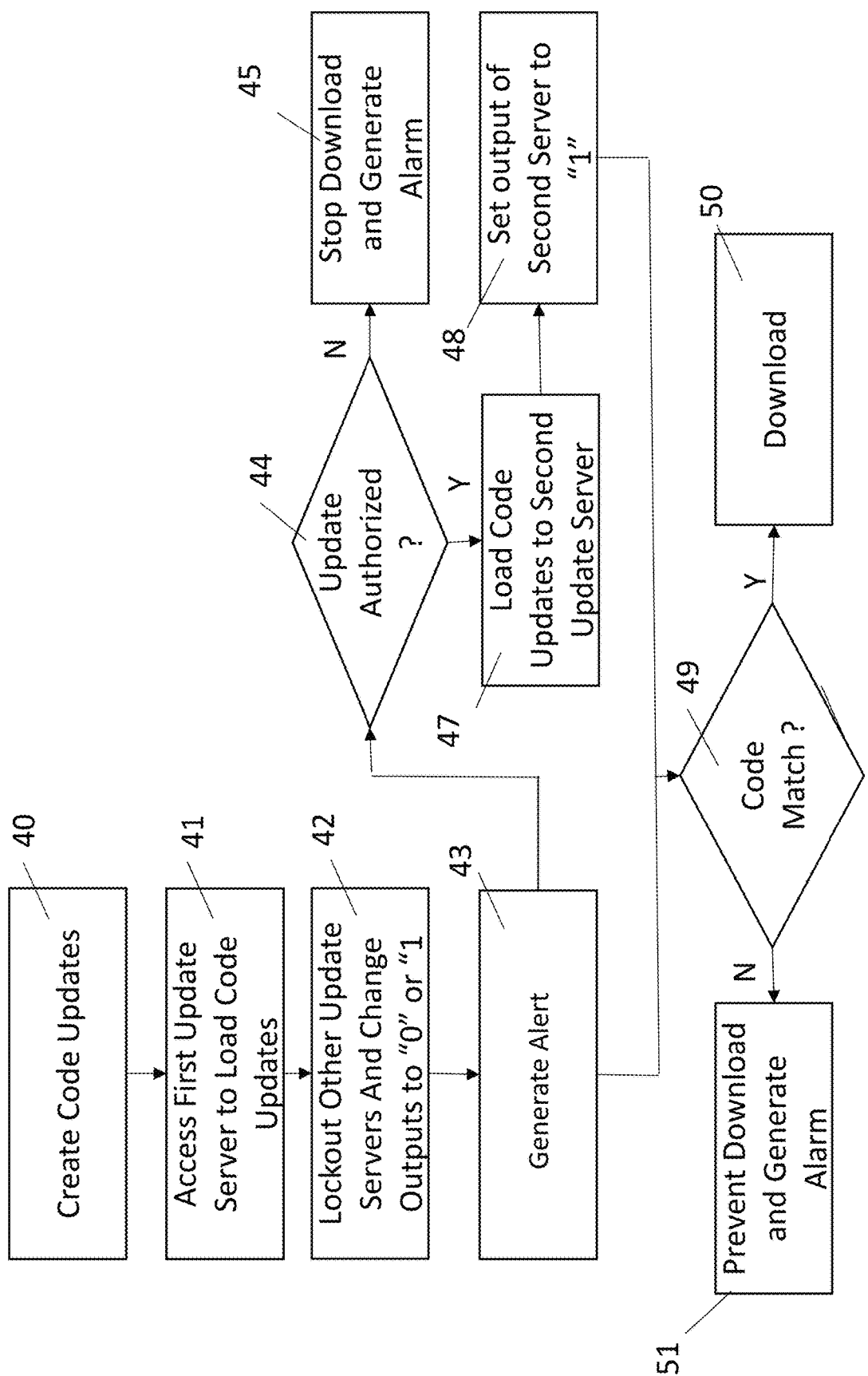
FIG. 4 is an exemplary flow diagram showing a process using the systems architectures shown in FIGS. 2 and 3.

Methods of Use. The following methods are meant to be exemplary only and are not meant to limit the scope of the disclosure or claims in any way. With reference to FIG. 4, there is shown a flow chart in which an exemplary method of the present disclosure may be implemented. The process starts at 40 during which code updates are created by developers or code maintenance personnel. Once those code updates are created and ready for downloads to remote devices 35, the process continues at 41 during which the first updating server which may, for example, be updating server 31a, is accessed and the code updates are loaded for download. At 42, the user that accessed the updating server 31a is locked out of all other updating servers, which may, for example, include updating server 31b. Moreover, the first updating server 31a will have its output to the input of the logical AND verification processor 32 set to "1". All other updating servers, including updating server 31b which have blocked access to the first user will change their respective outputs to the input of the logical AND verification processor 32 to a "0" to prevent unauthorized downloads. At 43, an alert is generated indicating that updating server 31a has been accessed and code updates have been loaded for download to remote devices 35. The alert may be an alarm, an email, a text message, an entry in an update log or any other type of alert. The alert may be recorded in the system and sent to an administrator, supervisor, auditor, or another person with authority to control downloads.

Once the first updating processor 31a is accessed and the alert generated, the decision as to whether the code update is authorized, tested, verified and/or approved is made at 44. This process may initiate automatically or at the command of a second user. If the code updates are not authorized or otherwise not ready for download, the verification process is stopped at 45 wherein an alarm or other notification may be generated. If the code update is authorized, at 47 a second user may access the second updating server 31b and load the verified code updates to the second updating server 31b. As such, if the code updates are authorized, both updating server 31a and updating server 31b will have the same code updates ready for downloading to remote devices 35. At 48, the second updating server 31*b* will change its output to the input of the logical AND verification processor 32 to a "1".

The outputs of both the first updating server 31*a* and the second updating server 31*b* to their respective inputs to the logical AND verification processor 32 will then be passed through a verification processor to determine whether the code updates match at 49. The verification function may be performed by a logical AND verification processor function in which case the download will continue only if the code updates being downloaded from updating server 31*a* and updating server 31*b* are identical. If the code updates are identical, the downloads of the code updates to remote devices 35 proceed at 50. If the code updates are not identical at 49, the downloads are prohibited and an alarm generated at 51.

In an aspect, the verification function may generate an output comprising code updates which is then encrypted for downloads to remote devices 35. The verification function may also append a key or other software validation code to indicate to remote devices 35 that the code updates have been authorized and have gone through this two-step verification process at the trusted site. If that validation code is not detected, then the remote devices 35 may ignore the code updates and generate an error code or alert.

In an aspect, the process may be duplicated such that the entire code update verification process is performed two or more times, with the outputs of each then going through an additional verification, i.e., logical AND function. That redundant process may be used for mission critical software updates such as safety of flight or autonomous vehicle software updates.

The present disclosure provides a system and method for a practical application to generate code updates that are subject to a two-step verification process to ensure that the code updates are authentic. The present disclosure would help detect when a rogue employee acting outside the scope of authority attempts to download malicious code to remote devices or prevent accidental or inadvertent code updates to be downloaded. Likewise, the two-step verification process may also help detect when a software download intended for remote devices has not gone through this two-step verification process which could expose system hacks which in that case the remote devices may independently reject as unauthorized downloads.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. For example, numerous methodologies for defining in-flight communications may be encompassed within the concepts of the present disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:
   monitoring access by a first user to a first updating server and a second updating server;
   suspending access by the first user to the second updating server when the first user accesses the first updating server to load a first code update to the first updating server;
   setting a first input to a verification processor from the first updating server to a "1" and a second input to the verification processor from the second updating server to a "0" when the first user accesses the first updating server;
   loading a second code update by a second user to the second updating server;
   comparing the first code update from the first updating server and the second code update from the second updating server;
   changing the second input to the verification processor to a "1" if the first code update and the second code update are identical; and
   downloading the first code update to a remote device based on the changing step.

2. The method of claim 1 wherein the downloading step occurs only when the first code update and the second code update are identical.

3. The method of claim 1 wherein the comparing step is performed by periodically comparing code versions in each of the first updating server and the second updating server.

4. The method of claim 1 further comprising setting the first input to the verification processor from the first updating server to a "1" and the second input to the verification processor from the second updating server to a "0" when the first user accesses the first updating server, thereby preventing the downloading step until the second input to the verification processor is changed to a "1".

5. The method of claim 1 further comprising receiving, by the second updating server, the second code update from a database upon command from the second user and wherein the downloading step is initiated when the first code update matches the second code update.

6. The method of claim 1 further comprising setting the second input to the verification processor to a value of "0" based on the suspending step, thereby preventing the downloading step.

7. The method of claim 6 further comprising changing the second input to the verification processor to a value of "1" when the first code update matches the second code update thereby enabling the downloading step.

8. A system comprising:
   a first updating server and a second updating server; and
   a verification processor configured to receive a first input from the first updating server and a second input from the second updating server wherein the first input has a value of "1" when a first code update is ready for downloading from the first updating server to a remote device and wherein the second input has a value of "0" until a second code update equivalent to the first code update is loaded onto the second updating server and wherein the second input changes to a value of "1" when the second code update is equivalent to the first code update, and wherein the verification processor permits or blocks downloading the first code update based on the first input and the second input.

9. The system of claim 8 further comprising a router configured to route the first code update to the remote device.

10. The system of claim 8 further comprising a controller configured to monitor access to the first updating server and the second updating server and to prevent access to the second updating server by a first user when the first user accesses the first updating server.

11. The system of claim 10 wherein an alarm is generated when the first updating server is accessed by the first user.

12. The system of claim 10 wherein the second updating server is only accessed by a second user.

13. The system of claim 8 wherein code updates are downloaded only when the first updating server and the second updating server are accessed by different users.

14. The system of claim 8 wherein downloads are prevented unless both the first input and the second input are set to a value of "1".

15. A system comprising:
a first updating server and a second updating server; and
wherein the second updating server has a processor and a memory coupled with the processor, the memory having stored thereon executable instructions that when executed by the processor cause the processor to effectuate operations comprising:

determining that there is a first code update on the first updating server for downloading to a remote device;

blocking access to the second updating server by a first user based on the determining step;

setting a first input to a verification processor from the first updating server to a "1" and a second input to the verification processor from the second updating server to a "0";

receiving a second code update from a second user; and if the first code update and the second code update are identical, then changing the second input to the verification processor to a "1"; and downloading the second code update to the remote device based on the changing.

16. The system of claim 15 wherein the first updating server has an output to the first input of the verification processor and the second updating server has an output to the second input of the verification processor and wherein the first input has a value of "1" based on the first code update and the second input has a value of "0" thereby blocking the downloading step until the second updating server receives the second code update matching the first code update and the value of the second input then changes to a "1" and thereby enabling the downloading step.

17. The system of claim 15 wherein the determining step is performed periodically by comparing code versions of the first updating server and the second updating server.

* * * * *